(12) United States Patent
Murakami

(10) Patent No.: US 8,483,429 B2
(45) Date of Patent: Jul. 9, 2013

(54) IMAGE PROCESSING APPARATUS, IMAGE FORMING APPARATUS, RECORDING MEDIUM AND IMAGE PROCESSING METHOD

(75) Inventor: Yoshinori Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 43 days.

(21) Appl. No.: 13/293,719

(22) Filed: Nov. 10, 2011

(65) Prior Publication Data

US 2012/0121122 A1    May 17, 2012

(30) Foreign Application Priority Data

Nov. 12, 2010  (JP) ................................. 2010-254142

(51) Int. Cl.
*G06K 9/00*         (2006.01)
*H04N 1/40*         (2006.01)

(52) U.S. Cl.
USPC ........................... 382/100; 382/162; 358/3.28

(58) Field of Classification Search
USPC .................. 382/100, 162–167, 232; 358/3.28
See application file for complete search history.

(56) References Cited

U.S. PATENT DOCUMENTS

| 6,711,285 | B2 * | 3/2004 | Noguchi | ....................... 382/162 |
| 6,724,941 | B1 * | 4/2004 | Aoyama | ....................... 382/254 |
| 7,599,078 | B2 * | 10/2009 | Sano | ........................... 358/1.13 |
| 8,004,698 | B2 * | 8/2011 | Sano | ........................... 358/1.13 |

FOREIGN PATENT DOCUMENTS

| JP | 2007-88763 A | 4/2007 |
| JP | 2008-22237 A | 1/2008 |

* cited by examiner

*Primary Examiner* — Shefali Goradia
(74) *Attorney, Agent, or Firm* — Birch, Stewart, Kolasch & Birch, LLP

(57) ABSTRACT

When dispersed large dots data associated with dispersed large dots which become visible as a result of making a copy or clustered small dots data (watermark pattern data) associated with clustered small dots which do not become visible as a result of making a copy is inputted to the watermark pattern generating section, the control section inputs the inputted dispersed large dots data or clustered small dots data to the watermark composition processing section. For a pixel corresponding to dispersed large dots data, the control section causes the watermark composition processing section to join data associated with an original image with data associated with a watermark and outputs obtained composite data to the image output apparatus. For a pixel corresponding to clustered small dots data, the watermark composition processing section outputs data associated with an original image to the image output apparatus.

8 Claims, 12 Drawing Sheets

F I G. 1
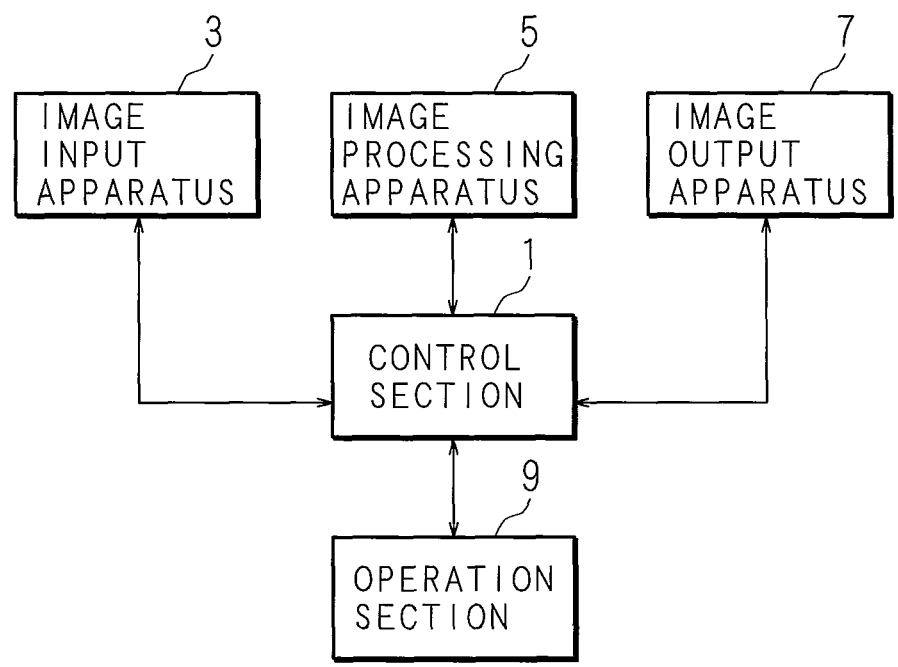

FIG. 5A
FIG. 5B
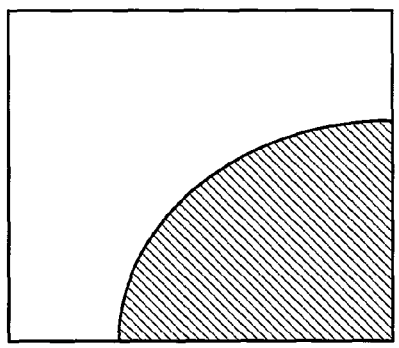
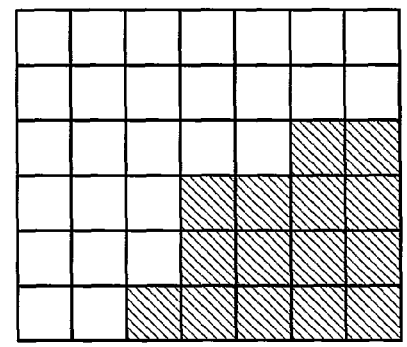
FIG. 5D
| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 15 | 15 |
| 0 | 0 | 0 | 15 | 15 | 15 | 15 |
| 0 | 0 | 0 | 15 | 15 | 15 | 15 |
| 0 | 0 | 15 | 15 | 15 | 15 | 15 |
FIG. 5C
| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 1 | 1 |
| 0 | 0 | 0 | 1 | 1 | 1 | 1 |
| 0 | 0 | 0 | 1 | 1 | 1 | 1 |
| 0 | 0 | 1 | 1 | 1 | 1 | 1 |

F I G. 6 A
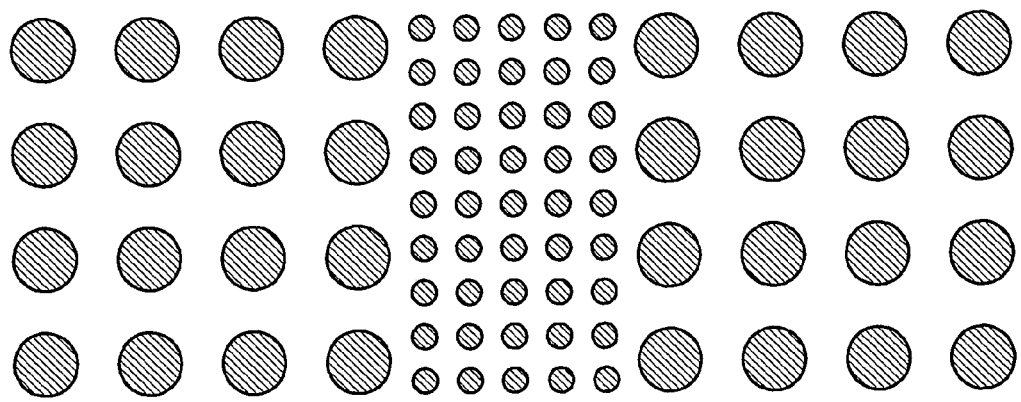
F I G. 6 B
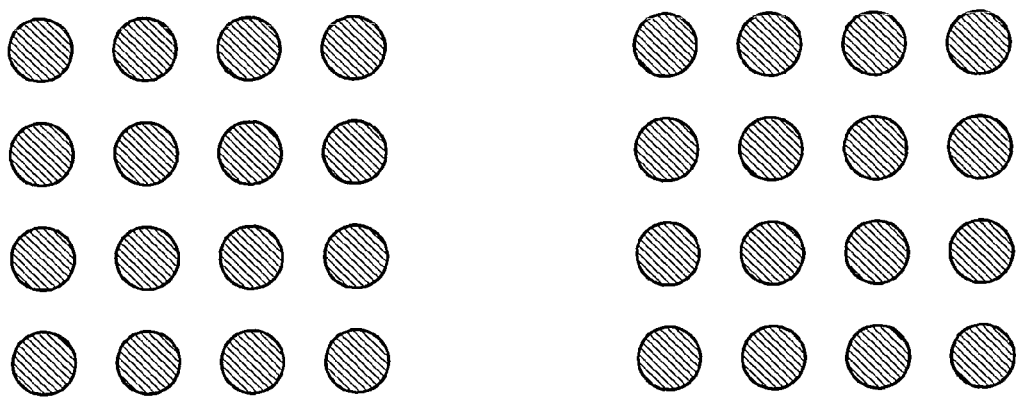

C : CYAN
M : MAGENTA
K : BLACK

IMAGE PROCESSING APPARATUS, IMAGE FORMING APPARATUS, RECORDING MEDIUM AND IMAGE PROCESSING METHOD

CROSS-REFERENCE TO RELATED APPLICATIONS

This Nonprovisional application claims priority under 35 U.S.C. §119(a) on Patent Application No. 2010-254142 filed in Japan on Nov. 12, 2010, the entire contents of which are hereby incorporated by reference.

BACKGROUND

1. Technical Field

The present invention relates to an image processing apparatus, an image forming apparatus, an image processing method, a computer program and a recording medium for joining an original image, which is obtained by reading an original, with a watermark for copy control, which appears as a result of making a copy.

2. Description of Related Art

Certified copies (e.g., family registers and certificates of residence) published by official agencies on the basis of original documents containing personal information are widely used as papers for authenticating individuals. In order to ensure the function as papers for authenticating individuals, certified copies are required to be distinguished clearly from duplications thereof. Moreover, certified copies published by official agencies require measures to protect privacy, since personal information is contained therein.

Documents printed on the basis of original documents in companies also require measures to protect privacy as well as the certified copies described above, since personal information such as customer information is sometimes contained therein. Moreover, when commercial or technical confidential information is contained in documents created in companies, it is necessary to prevent leakage of the documents to a third party who is under no obligation to keep secrets.

Japanese Patent Application Laid-Open No. 2007-88763 (Patent Document 1) discloses a print control unit for causing a computer to join contents data (original image data) indicative of information contained in an original document with watermark data indicative of a watermark for copy control (e.g., an illegal copy warning text such as "COPY", "DON'T COPY" or "CONFIDENTIAL"), which does not appear in a certified copy or a document but appears in a duplication of a certified copy or a document made by a copying machine, and printing a certified copy or a document on the basis of obtained composite data. The print control unit can cause a computer to join original image data with watermark data and print an image associated with the watermark data and the original image data on normal paper, eliminating the need to use anti-copying and anti-counterfeiting paper having the above-described watermark for copy control printed thereon in advance. Moreover, the user can select easily a watermark appropriate for the information contained in a certified copy or a document. In recent years, an image forming apparatus for reading an original document printed on paper at an image reading unit to generate original image data and joining the generated original image data with prestored watermark data to form an image of a certified copy or a document has also been proposed in view of a case where the original document is not digitized.

Formation of an image of a certified copy or a document by joining original image data with watermark data consumes more recording material than formation of only an original image associated with original image data. Japanese Patent Application Laid-Open No. 2008-22237 (Patent Document 2) discloses an image processing apparatus for forming an explicit watermark over an original image. The image processing apparatus limits an area on paper for printing a watermark so as to reduce the consumption of recording material. The technique of limiting an area on paper for printing a watermark according to Patent Document 2 is considered applicable also to an image forming apparatus for forming a watermark for copy control, which appears as a result of making a copy.

SUMMARY

However, when the above technique described in Patent Document 2 is applied to the image forming apparatus, a watermark is formed partially depending on the size or the length, for example, of a string of an illegal copy warning text, and the appearance of a copy obtained by copying a certified copy or a document printed by the image forming apparatus is extremely degraded. Moreover, it is impossible to reduce the consumption of recording material at the image forming apparatus when a watermark for copy control is formed over the whole area of paper.

The present invention has been devised in view of such a situation, and an object thereof is to provide an image processing apparatus, an image forming apparatus, an image processing method, a computer program and a recording medium, in which the consumption of recording material can be reduced without causing degradation of the appearance of a copy.

Means for Solving the Problems

An image processing apparatus according to the present invention is characterized by comprising: a generating section for generating watermark data indicative of a watermark for copy control, which appears as a result of making a copy; and a composition section for joining original image data obtained by reading an original document with the watermark data generated by the generating section, wherein the original image data includes data of a plurality of color components associated with a pixel constituting an image, wherein the watermark data includes data of one color component associated with a pixel constituting an image, further comprising: a first selecting section for selecting data of one color component associated with the watermark data and data of a plurality of color components associated with the original image data for a pixel where data of one color component associated with the watermark data is used for image formation;

a density decreasing section for decreasing density of colors indicated by data of remaining color components, which is obtained by excluding data of a same color as data of one color component associated with the watermark data from data of a plurality of color components associated with the original image data selected by the first selecting section; and a second selecting section for selecting data of a plurality of color components associated with the original image data for a pixel where data of one color component associated with the watermark data is not used for image formation; wherein composite data is composed from data of one color component associated with the watermark data and data of a plurality of color components associated with the original image data selected by the first selecting section and outputted, or data of a plurality of color components associated with the original image data selected by the second selecting section is outputted.

An image processing apparatus according to the present invention is characterized in that the first selecting section does not perform selection of the data of remaining color components.

An image processing apparatus according to the present invention is characterized in that the first selecting section does not perform selection of the data of remaining color components when the data of one color component is data which indicates black.

An image processing apparatus according to the present invention is characterized in that the watermark data for each pixel is associated with a dot pattern, which appears as a result of making a copy, or a dot pattern, which does not appear as a result of making a copy, and data of one color component associated with the watermark data and data of remaining color components having a color density decreased by a predetermined operation are outputted for the pixel corresponding to the dot pattern, which appears as a result of making a copy.

An image processing apparatus according to the present invention is characterized by further comprising an accepting section for accepting an instruction of saving usage of recording material for image formation, wherein the density decreasing section decreases density of colors indicated by the data of remaining color components when the instruction is accepted by the accepting section.

An image forming apparatus according to the present invention is characterized by comprising: an image processing apparatus described above; and a forming section for forming an image on a sheet on a basis of the original image data and the watermark data, which are processed by the image processing apparatus.

An image processing method according to the present invention is characterized by comprising steps of generating watermark data indicative of a watermark for copy control, which appears as a result of making a copy; and joining original image data obtained by reading an original document with the generated watermark data, wherein the original image data includes data of a plurality of color components associated with a pixel constituting an image, wherein the watermark data includes data of one color component associated with a pixel constituting an image, further comprising steps of selecting data of one color component associated with the watermark data and data of a plurality of color components associated with the original image data for a pixel where data of one color component associated with the watermark data is used for image formation; decreasing density of colors indicated by data of remaining color components, which is obtained by excluding data of a same color as data of one color component associated with the watermark data from data of a plurality of color components associated with the original image data selected in said step; selecting data of a plurality of color components associated with the original image data for a pixel where data of one color component associated with the watermark data is not used for image formation; composing composite data from the data of one color component and data of a plurality of color components associated with the original image data and outputting the composite data when data of one color component associated with the watermark data and data of a plurality of color components associated with the original image data are selected; and outputting the data of a plurality of color components when data of a plurality of color components associated with the original image data is selected.

A non-transitory computer-readable medium according to the present invention is characterized by the computer program comprising steps of: causing a computer to generate watermark data indicative of a watermark for copy control, which appears as a result of making a copy; and causing a computer to join original image data obtained by reading an original document with the generated watermark data, wherein the original image data includes data of a plurality of color components associated with a pixel constituting an image, wherein the watermark data includes data of one color component associated with a pixel constituting an image, further comprising steps of; causing a computer to select data of one color component associated with the watermark data and data of a plurality of color components associated with the original image data for a pixel where data of one color component associated with the watermark data is used for image formation; causing a computer to decrease density of colors indicated by data of remaining color components, which is obtained by excluding data of a same color as data of one color component associated with the watermark data from data of a plurality of color components associated with the original image data selected in said step; causing a computer to select data of a plurality of color components associated with the original image data for a pixel where data of one color component associated with the watermark data is not used for image formation; causing a computer to compose composite data from the data of one color component and data of a plurality of color components associated with the original image data and output the composite data when data of one color component associated with the watermark data and data of a plurality of color components associated with the original image data are selected; and causing a computer to output the data of a plurality of color components when data of a plurality of color components associated with the original image data is selected.

In the present invention, for a pixel where an original image is to be joined with a watermark, data of one color component associated with the watermark data and data of a plurality of color components associated with the original image data are selected as color component data for image formation, and the respective selected color component data are joined with each other and outputted. Here, correction is executed for data of remaining color components, which is obtained by excluding data of the same color as the data of one color component from the data of a plurality of color components associated with the original image data, so as to decrease the density of colors indicated by the data of remaining color components. On the other hand, for a pixel where an original image is no to be joined with a watermark, data of a plurality of color components associated with the original image data is selected as color component data for image formation and outputted.

Moreover, in the present invention, selection of the data of remaining color components for a pixel where an original image is to be joined with a watermark is stopped as needed, so that only a watermark is formed.

Moreover, in the present invention, selection of the data of remaining color components for a pixel where an original image is to be joined with a watermark is stopped as needed when the data of one color component associated with the watermark data is data indicative of black.

Moreover, in the present invention, data of one color component associated with the watermark data is outputted and data of remaining color components having a color density decreased by a predetermined operation is outputted for a pixel corresponding to a dot pattern, which appears as a result of making a copy.

Moreover, in the present invention, correction is executed for the data of remaining color components when a reduction instruction of reducing the use of recording material for image formation is accepted, so that the desire of the user to reduce the use of recording material can be reflected in image formation.

Effect of the Invention

With an image processing apparatus, an image forming apparatus, an image processing method, a computer program and a recording medium according to the present invention, for a pixel where an original image is to be joined with a watermark, data of one color component associated with the watermark and data of a plurality of color components associated with the original image data are selected as color component data for image formation and the respective selected color component data are joined with each other. Here, correction is executed for data of remaining color components, which is obtained by excluding data of the same color as the data of one color component from the data of a plurality of color components associated with the original image data, so as to decrease the density of colors indicated by the data of remaining color components. On the other hand, for a pixel where an original image is not to be joined with a watermark, data of a plurality of color components associated with the original image data is selected as color component data for image formation. In such a structure, a watermark can be formed uniformly on a copy and degradation of the appearance can be avoided. Moreover, the consumption of recording material can be reduced since the density of colors indicated by the data of remaining color components associated with an original image is decreased for a pixel where a watermark is to be formed. Moreover, the loss of the color shade due to decrease of the density of colors indicated by the data of remaining color components can be minimized and the quality of an image to be formed can be maintained, since the density of a color indicated by the one color component associated with a watermark is maintained for a pixel where a watermark is to be formed.

The above and further objects and features will more fully be apparent from the following detailed description with accompanying drawings.

BRIEF DESCRIPTION OF THE SEVERAL VIEWS OF THE DRAWINGS

FIG. 1 is a block diagram for explaining the internal configuration of an image forming apparatus according to Embodiment 1;

FIGS. 5A, 5B, 5C and 5D are conceptual diagrams for explaining the process of bit conversion of illegal copy warning text data;

FIGS. 6A and 6B are explanatory diagrams for explaining the relation between the number of dots per unit area and the type of a watermark;

DETAILED DESCRIPTION

Embodiment 1

Figure 2:
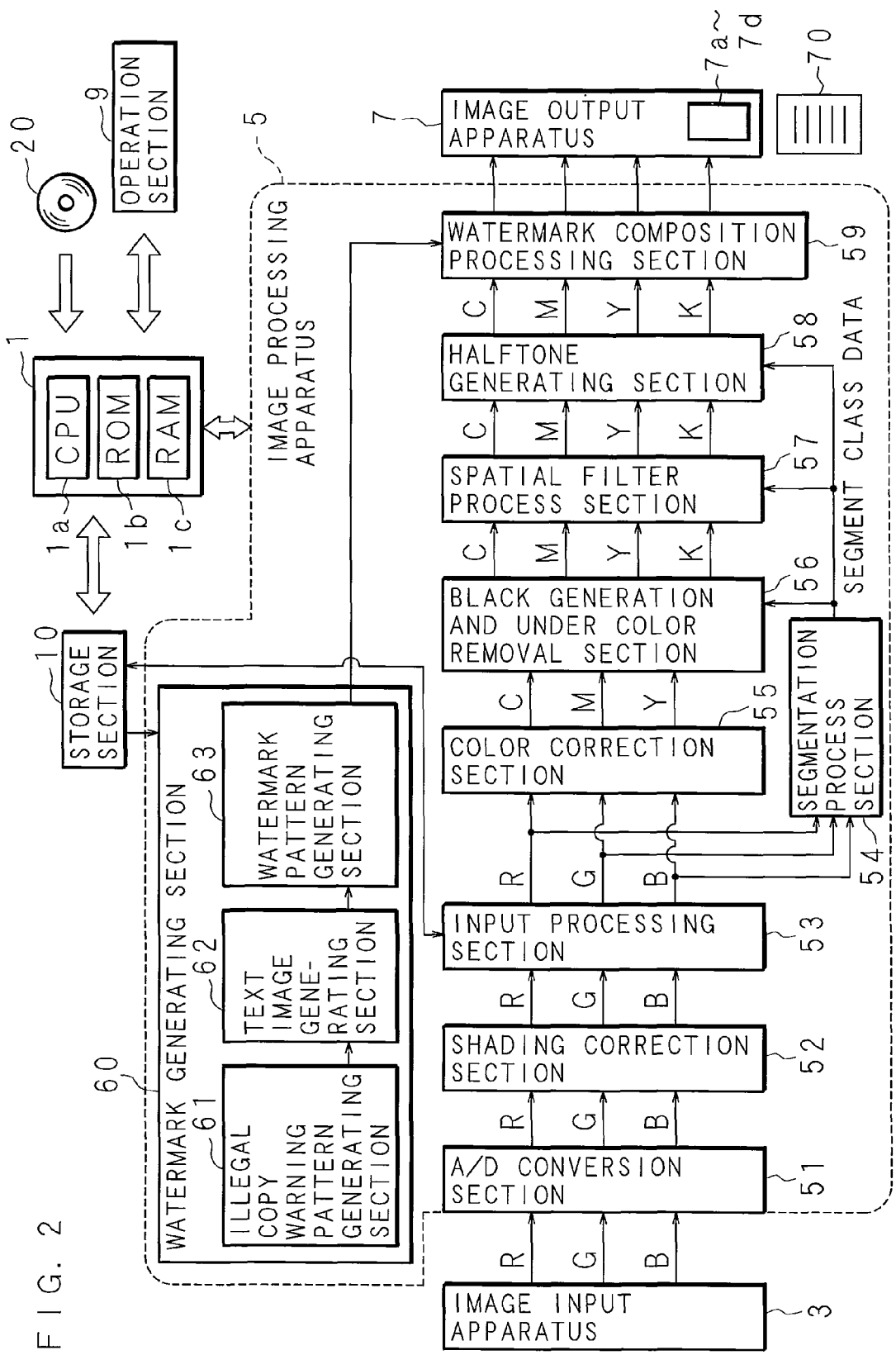
FIG. 2 is a block diagram for explaining the configuration of an image processing apparatus.

The following description will explain the present invention in detail with reference to the drawings illustrating an image forming apparatus according to Embodiment 1. The image forming apparatus is implemented with, for example, a copying machine or a multi-function peripheral having a copying function, a facsimile transmitting and receiving function, an image transmitting function, a printing function or the like. FIG. 1 is a block diagram for explaining the internal configuration of an image forming apparatus, and FIG. 2 is a block diagram for explaining the configuration of an image processing apparatus. The image forming apparatus includes a control section 1, an image input apparatus 3, an image processing apparatus 5, an image output apparatus 7 and an operation section 9. As illustrated in FIG. 2, the control section 1 is provided with: a ROM (Read Only Memory) 1b storing a control program for controlling respective hardware parts; a CPU (Central Processing Unit) 1a for executing the control program; a RAM (Random Access Memory) 1c for storing various kinds of data to be generated during execution of the control program; and the like. Here, the ROM 1b may have a writable structure. In such a case, the control program may be recorded in a computer-readable recording medium 20 and downloaded to the ROM 1b.

The image input apparatus 3 is means for reading an image of an original document and is provided with: a light source for irradiating an original document to be read with light; an image sensor such as a CCD (Charge Coupled Device); and the like. In the image input apparatus 3, an image of reflected light from an original document, which is put on a predetermined reading station, is focused on the image sensor and an analog RGB (R: Red, G: Green, B: Blue) electric signal is outputted. The analog electric signal outputted from the image input apparatus 3 is inputted to the image processing apparatus 5.

The image processing apparatus 5 converts the analog electric signal outputted from the image input apparatus 3 into a digital electric signal and then performs image processing depending on the type of an original document to generate an image signal to be outputted. The generated image signal is outputted to the image output apparatus 7. The image output apparatus 7 is provided with containers storing respective recording material 7a-7d of cyan, magenta, yellow and black. The image processing apparatus 5 generates a CMYK signal (C: Cyan, M: Magenta, Y: Yellow, K: Black) as an image signal to be outputted. The internal configuration, the operation and the like of the image processing apparatus 5 will be described later in detail.

The image output apparatus 7 is means for forming an image on a sheet 70, such as paper or an OHP film, on the basis of the image signal outputted from the image processing apparatus 5. Accordingly, the image output apparatus 7 is provided with: charging means for electrically charging a photorecepter at a predetermined potential; a laser scanning unit for producing laser light in response to image data accepted from outside so as to generate an electrostatic latent image on the photorecepter; developing means for supplying toner, which functions as the recording material 7a-7d, to the electrostatic latent image formed on the surface of the photorecepter so as to visualize the image; transferring means for transferring a toner image formed on the surface of the photorecepter onto paper; and the like (not illustrated in the drawings), so as to form an image desired by the user on paper by electrophotography. Here, image formation may be achieved by inkjet printing, thermal transfer printing, dye sublimation printing or the like in place of the electrophotography using a laser scanning unit.

The operation section 9 is provided with various kinds of switches or buttons for accepting instructions, selection operations or the like by the user.

The image processing apparatus 5 is provided with an A/D conversion section 51, a shading correction section 52, an input processing section 53, a segmentation process section 54, a color correction section 55, a black generation and under color removal section 56, a spatial filter process section 57, a halftone generating section 58, a watermark composition processing section 59 and a watermark generating section 60.

The A/D conversion section 51 converts an analog RGB signal inputted from the image input apparatus 3 into a digital signal. The shading correction section 52 performs the processing of removing various kinds of distortion to be generated in an illuminating system, an image focusing system or an image sensing system of the image input apparatus 3, on the digital RGB signal outputted from the A/D conversion section 51. The shading correction section 52 also adjusts the color balance.

The input processing section 53 performs image adjustment processing such as gamma correction, removal of page background density and contrast control. The image forming apparatus is also provided with a storage section 10 having an HDD (Hard Disk Drive), a flash memory and the like. Data outputted from the input processing section 53 is stored in the storage section 10.

Using an RGB signal, the segmentation process section 54 performs the processing of segmenting each pixel in an input image into any one region among a black text region, a color text region, a halftone dot region, a photograph region and the like. On the basis of the segmentation result, the segmentation process section 54 outputs a segmentation class signal indicative of a region to which a pixel belongs, to the color correction section 55, the black generation and under color removal section 56, the spatial filter process section 57 and the halftone generating section 58 of the following stage and outputs an input signal outputted from the input processing section 53 to the color correction section 55 of the following stage without modification.

The color correction section 55 generates a CMY signal (C: Cyan, M: Magenta, Y Yellow) which is complementary colors of an RGB signal saved in the storage section 10 and performs the processing of removing color impurity caused by the spectral characteristics of CMY color materials including unnecessary absorption components in order to improve the color reproducibility.

The black generation and under color removal section 56 performs black generation for generating a black (K) signal from a three CMY signal obtained by color correction and performs the processing of generating a new CMY signal by subtracting the K signal obtained by black generation from the original CMY signal. By such processing, a three CMY signal is converted into a four color CMYK signal.

An example of black generation processing is a method (common method) of black generation using skeleton black. When using the method, the black generation and under color removal processing is expressed by the following expression, assuming that the input/output characteristics of the skeleton curve is expressed by y=f(x), inputted data are denoted by C, M and Y outputted data are denoted by C', M', Y' and K', and the UCR (Under Color Removal) rate is denoted by α (0<α<1).

$$K'=f\{\min(C,M,Y)\}$$

$$C'=C-\alpha K'$$

$$M'=M-\alpha K'$$

$$Y'=Y-\alpha K'$$

The spatial filter process section 57 performs spatial filter processing using a digital filter, on image data of a CMYK signal inputted from the black generation and under color removal section 56 on the basis of a segmentation class signal and corrects the spatial frequency characteristics so as to perform the processing of preventing blurring or graininess degradation of an output image.

For example, the enhancement of high frequency components of a region segmented by the segmentation process section 54 into a black text or a color text is carried out by an edge enhancement process in the spatial filter processing by the spatial filter process section 57 in order to improve the reproducibility of a black text or a color text. At the same time, the halftone generating section 58 generates 4-bit halftone data with a screen having high resolution suitable for reproduction of high frequency components. Here, binarization processing may be executed by the halftone generating section 58.

The watermark composition processing section 59 joins watermark pattern data inputted from the watermark generating section 60 with halftone data inputted from the halftone generating section 58. The composition method will be described later in detail. The watermark generating section 60 is provided with an illegal copy warning text generating section 61, a text image generating section 62 and a watermark pattern generating section 63. The illegal copy warning text generating section 61 generates illegal copy warning text data such as "COPY", "DON'T COPY" and "CONFIDENTIAL" on the basis of an instruction from the operation section 9. The text image generating section 62 converts the illegal copy warning text data into bitmap image data. The watermark pattern generating section 63 converts the bitmap image data into watermark pattern data including information indicative of clustered small dots and information indicative of dispersed large dots.

Figure 3:
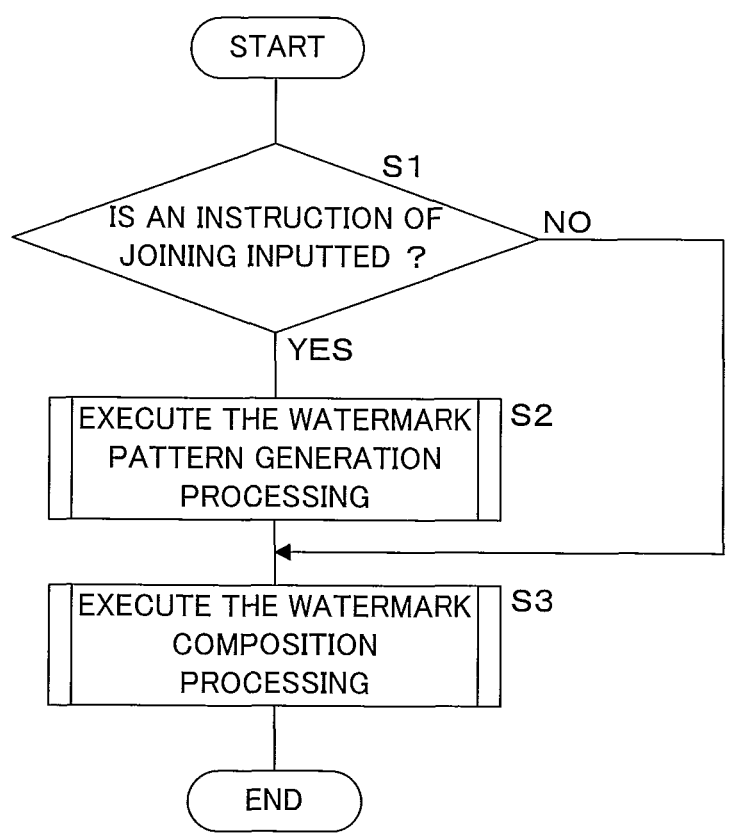
FIG. 3 is a flowchart for explaining the composition processing of joining halftone data with watermark pattern data.

FIG. 3 is a flowchart for explaining the composition processing of joining halftone data with watermark pattern data.

The control section 1 determines whether an instruction of joining an original image read by the image input apparatus 3 with a watermark has been inputted from the operation section 9 or not (step S1). When the instruction has not been inputted (step S1: NO), the control section 1 terminates the composition processing. When the instruction has been inputted (step S1: YES), the control section 1 executes the watermark pattern generation processing (step S2). The control section 1 then executes the watermark composition processing (step S3).

Figure 4:
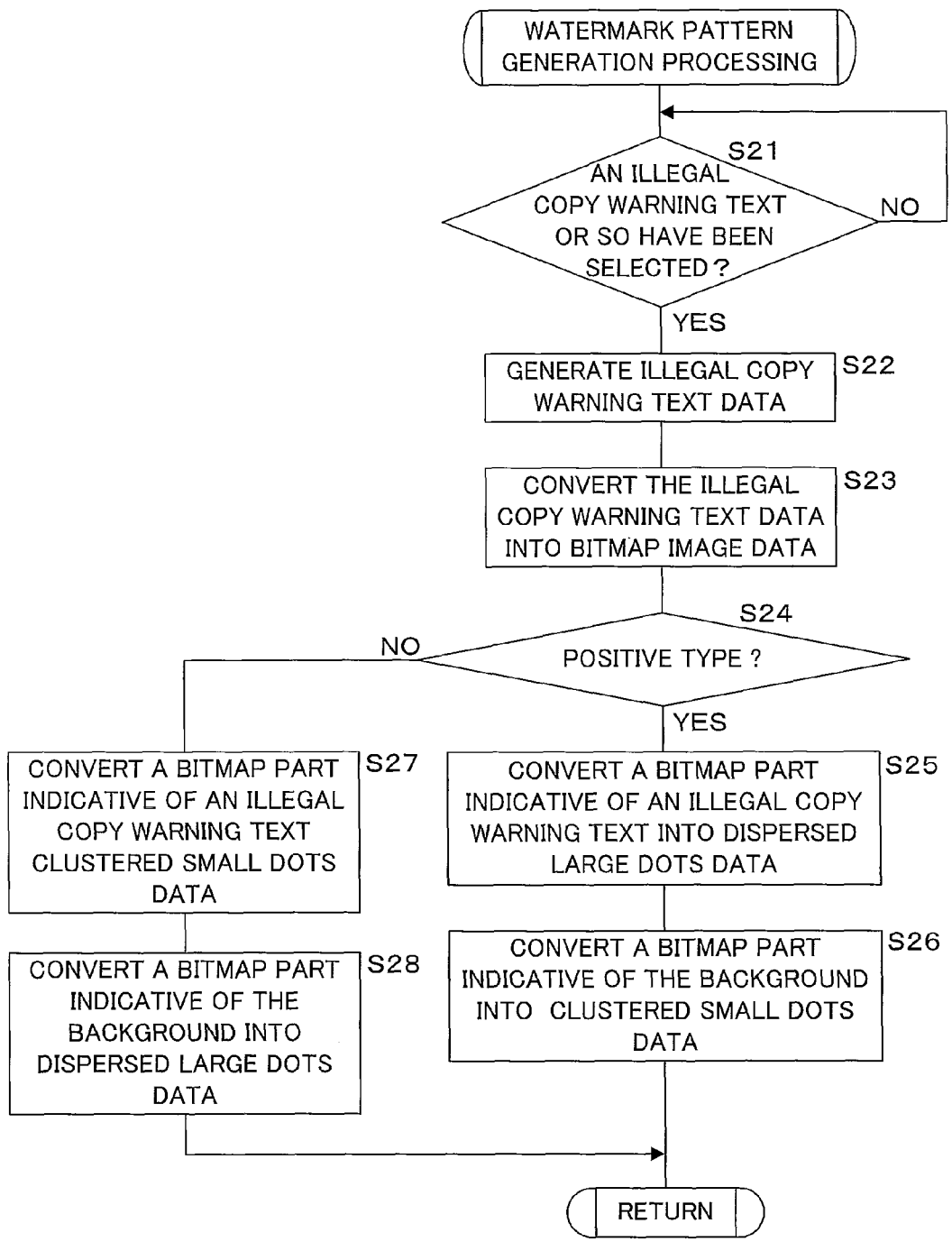
FIG. 4 is a flow chart for explaining the watermark pattern generation processing of generating watermark pattern data.

FIG. 4 is a flow chart for explaining the watermark pattern generation processing of generating watermark pattern data, and FIGS. 5A, 5B, 5C and 5D are conceptual diagrams for explaining the process of bit conversion of illegal copy warning text data. FIG. 5A is a conceptual diagram illustrating illegal copy warning text data, wherein a black part corresponds to a part of an illegal copy warning text while a white part corresponds to the background. FIG. 5B is a conceptual diagram illustrating the state where the illegal copy warning text is converted into bitmap image data. FIG. 5C is a conceptual diagram illustrating the state where the bitmap image data is replaced with binary data, wherein the number "1" corresponds to dispersed large dots data for forming an image with dispersed large dots in formation of an image on paper while the number "0" corresponds to clustered small dots data for forming an image with clustered small dots in formation of an image on paper. FIG. 5D is a conceptual diagram illustrating the state where the binary data is converted into 4-bit data.

The control section 1 waits until a signal indicative of selection of any color component data (plane) of C, M or K to be used for a watermark and an illegal copy warning text associated with a watermark and a signal indicative of selection of the type (a positive type in which an illegal copy warning text is printed and appears, or a negative type in which an illegal copy warning text is not printed and does not readily appear) of a watermark are inputted from the operation section 9 (step S21: NO). Here, information on an illegal copy warning text is prestored in the storage section 10 and called up when the operation section 9 is operated. The image forming apparatus also has a display panel, which is not illustrated in the drawings, and a plurality of illegal copy warning texts, colors of a plane and types of a watermark, which have been called up, are displayed on the display panel. The user selects an illegal copy warning text, a color of a plane and a type of a watermark which he/she desires. When a signal indicating that an illegal copy warning text, a color of a plane and a type of a watermark have been selected is inputted from the operation section 9 (step S21: YES), the control section 1 causes the illegal copy warning text generating section 61 to generate illegal copy warning text data indicative of the selected illegal copy warning text (step S22, see FIG. 5A). Here, it is to be understood that the display panel also functions as the operation section 9 when the display panel is provided with a touch panel.

Next, the control section 1 causes the text image generating section 62 to convert the illegal copy warning text data into bitmap image data (step S23, see FIG. 5B). The control section 1 then determines whether a positive type has been selected as the type of a watermark or not (step S24). When a positive type has been selected (step S24: YES), the control section 1 causes the watermark pattern generating section 63 to convert a bitmap part indicative of an illegal copy warning text into "1", i.e., dispersed large dots data (step S25). The control section 1 then causes the watermark pattern generating section 63 to convert a bitmap part indicative of the background into "0", i.e., clustered small dots data (step S26). When it is determined in the step S24 that a positive type has not been selected (step S24: NO), that is, when a negative type has been selected, the control section 1 causes the watermark pattern generating section 63 to convert a bitmap part indicative of an illegal copy warning text into "0", i.e., clustered small dots data (step S27). The control section 1 then causes the watermark pattern generating section 63 to convert a bitmap part indicative of the background into "1", i.e., dispersed large dots data (step S28).

The following description will explain the relation between the number of dots per unit area and the type of a watermark. FIGS. 6A and 6B are explanatory diagrams for explaining the relation between the number of dots per unit area and the type of a watermark.

In the image described in FIG. 6A, a dispersed large dots part, including a small number of dots per unit area, is arranged respectively on the left and on the right, and a clustered small dots part, including a large number of dots per unit area, is arranged therebetween. The area occupied with all dots per unit area is set at approximately the same area at the clustered small dots part and at the dispersed large dots part, so that both parts are recognized as approximately the same density and this makes it difficult for the user to get a view of a watermark. On the other hand, described in FIG. 6B is an image obtained by copying the watermark with a copying machine. A copying machine can recognize the dispersed large dots part but cannot recognize the clustered small dots part, since the area of one dot in the clustered small dots part is small and the clustered small dots part is removed in the process of the image processing. Accordingly, the clustered small dots part is not copied and does not readily appear in a copy image as illustrated in FIG. 6B. This makes it easy for the user to get a view of a watermark. The steps S25 and S26 allow the user to get a view of an illegal copy warning text as if the illegal copy warning text is printed on the background in a copy image (a watermark of a positive type). On the other hand, the steps S27 and S28 allow the user to get a view of an illegal copy warning text as the background in a copy image (a watermark of a negative type).

Figure 7A:
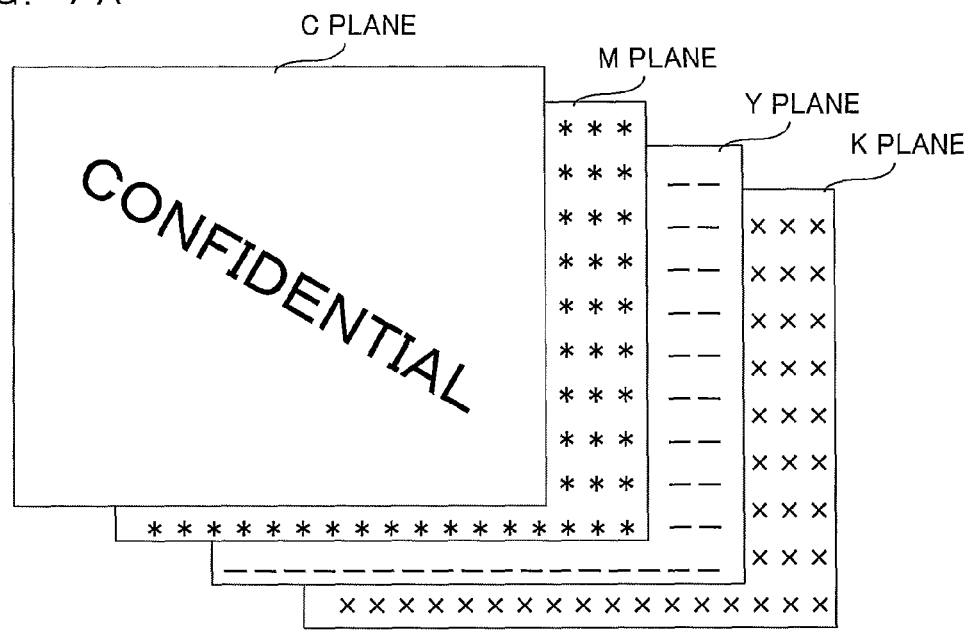
FIGS. 7A and 7B are conceptual diagrams illustrating respective planes composing image data.
Figure 7B:
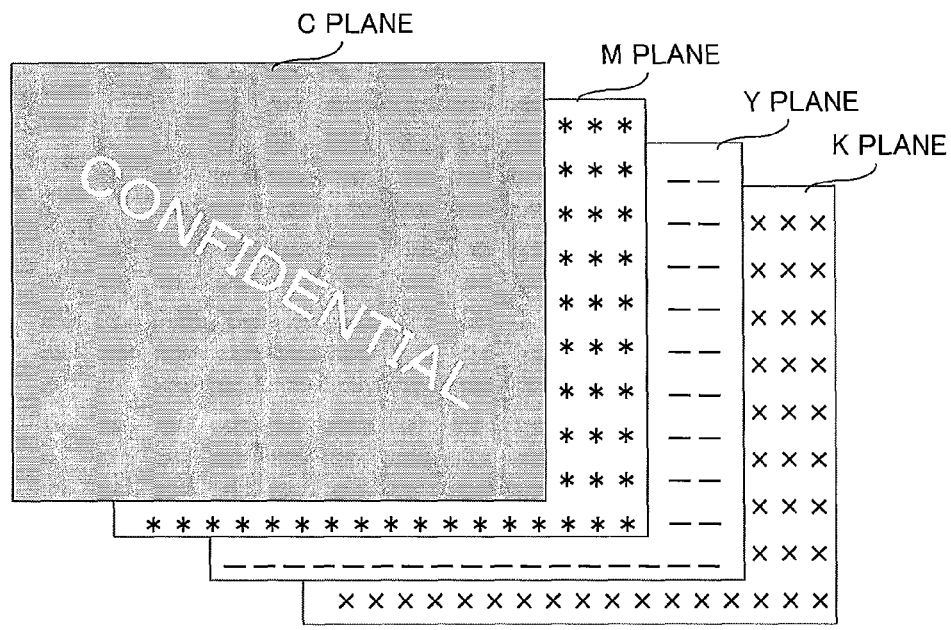

FIGS. 7A and 7B are conceptual diagrams illustrating respective planes composing image data. FIG. 7A is a conceptual diagram illustrating respective planes composing image data in a case where the plane to be used for a watermark is a C plane and the type of a watermark is a positive type while FIG. 7B is a conceptual diagram illustrating respective planes composing image data in a case where the plane to be used for a watermark is a C plane and the type of a watermark is a negative type, wherein a chromatic part in the C plane corresponds to a dispersed large dots part while an achromatic part corresponds to a clustered small dots part.

When the type of a watermark is a positive type as illustrated in FIG. 7A, an illegal copy warning text "CONFIDENTIAL" in the C plane associated with a watermark is described with dispersed large dots while the other part is described with clustered small dots. On the other hand, when the type of a watermark is a negative type as illustrated in FIG. 7B, an illegal copy warning text "CONFIDENTIAL" in the C plane associated with a watermark is described with clustered small dots while the other part is described with dispersed large dots. Here, a text other than "CONFIDENTIAL" may be employed as an illegal copy warning text, and a symbol or a figure for warning may be used in place of an illegal copy warning text.

Figure 8:
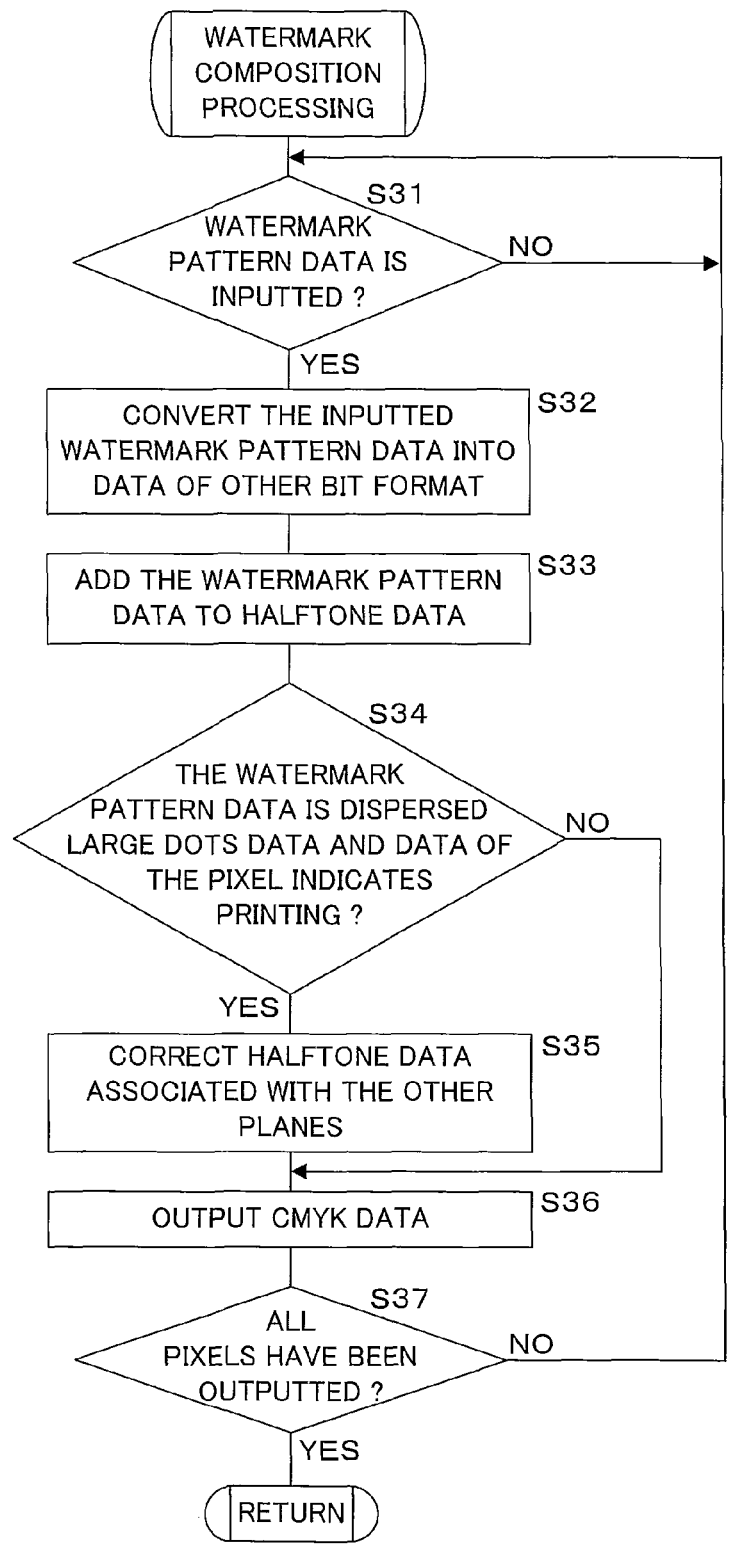
FIG. 8 is a flow chart for explaining the watermark composition processing of joining dispersed large dots data and clustered small dots data with halftone data.
Figure 9A:
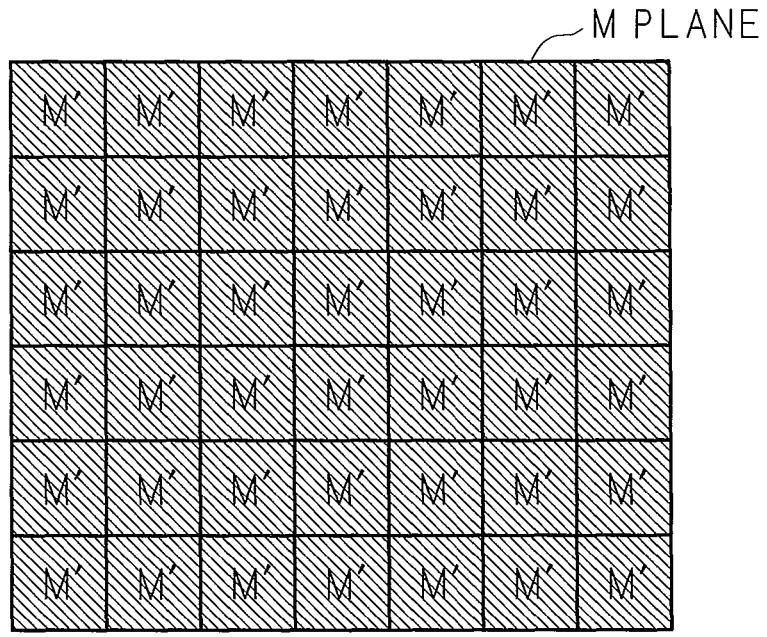
FIGS. 9A and 9B are conceptual diagrams illustrating correction of halftone data for a plane other than a watermark.
Figure 9A:
Figure 9B:
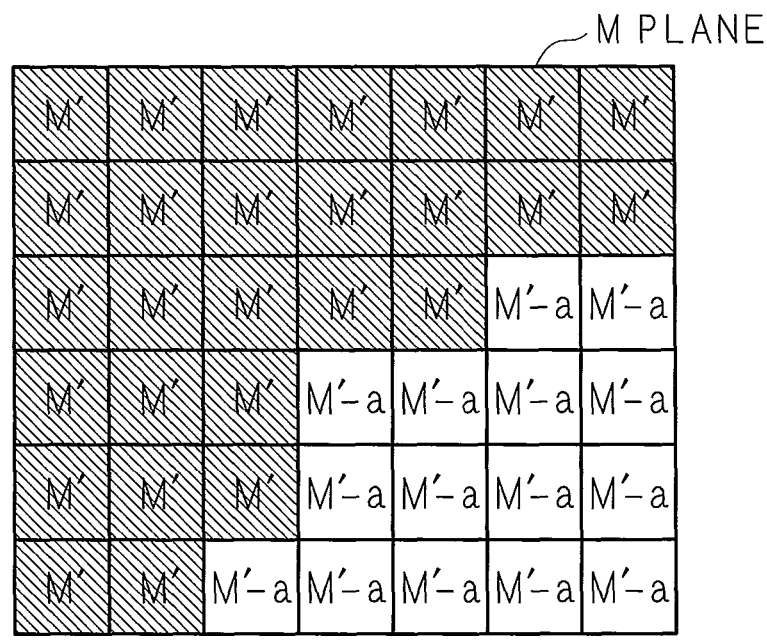
Figure 10A:
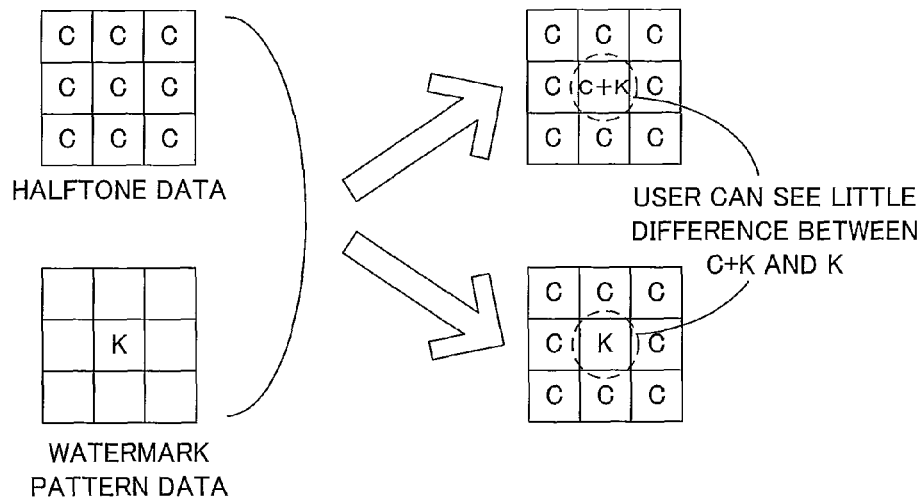
FIGS. 10A and 10B are explanatory diagrams for explaining the visibility obtained when dispersed large dots data associated with black is added to halftone data and the visibility obtained when dispersed large dots data associated with a color other than black is added to halftone data.
Figure 10B:
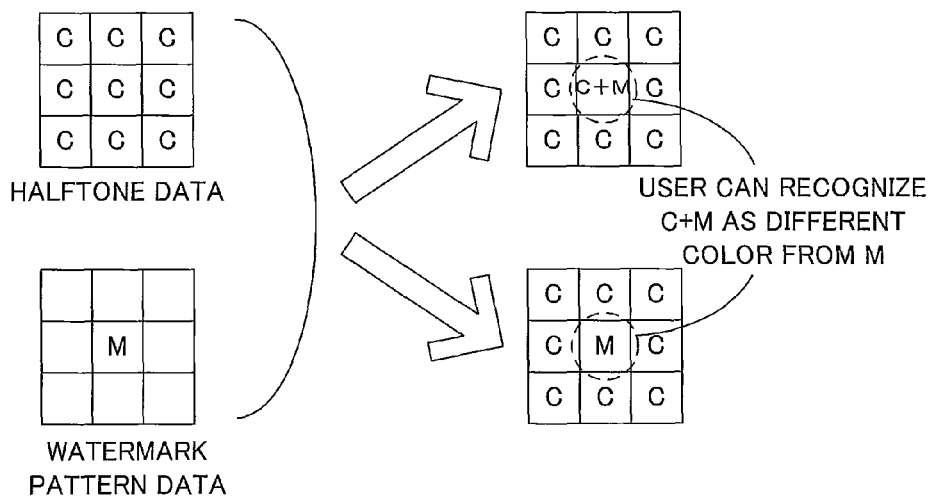

FIG. 8 is a flow chart for explaining the watermark composition processing of joining dispersed large dots data and clustered small dots data with halftone data, FIGS. 9A and 9B are conceptual diagrams illustrating correction of halftone data for a plane other than a watermark, and FIGS. 10A and 10B are explanatory diagrams for explaining the visibility obtained when dispersed large dots data associated with black is added to halftone data and the visibility obtained when dispersed large dots data associated with a color other than black is added to halftone data.

The control section 1 waits until watermark pattern data is inputted to the watermark pattern generating section 63 (step S31: NO). Watermark pattern data is composed of a signal X indicative of dispersed large dots data or clustered small dots data and a signal Z indicative of an output value (to output a dot) for image formation (e.g., printing). For example, dispersed large dots data is expressed by X=0, clustered small dots data is expressed by X=1, a signal indicative of an output value is expressed by Z=0 when printing is not to be performed, and a signal indicative of an output value is expressed by Z=1 when printing is to be performed. When watermark pattern data is inputted to the watermark pattern generating section 63 (step S31: YES), the control section 1 causes the watermark pattern generating section 63 to convert the inputted watermark pattern data into data of 4-bit format (data format having the same gray level (gray scale) as that of halftone data generated by the halftone generating section 58), for example, (step S32) and to input the converted data to the watermark composition processing section 59. Pixel data "0" of a pixel, which is not to be printed, is converted into a binary-coded decimal number "0000" (Z=0 in decimal number), while pixel data "1" of a pixel, which is to be printed, is converted into a binary-coded decimal number "1111" (Z=15 in decimal number) (see FIG. 5D wherein pixel data is described in decimal number).

The control section 1 causes the watermark composition processing section to select watermark pattern data Z and a pixel of halftone data in a plane corresponding to the watermark pattern data and to add one to the other (step S33). For example, when pixel values indicative of halftone data for the respective planes of CMYK are respectively (C', M', Y', K') and a plane to be used for a watermark is C (cyan), a predetermined value Z (a signal Z indicative of an output value) is added to the halftone data C' and the pixel values become (C'+Z, M', Y', K'). Here, when a value in each plane exceeds "15" (maximum value in 4-bit format), a value obtained by addition is represented as "15". Accordingly, when the predetermined value Z is "15", a value obtained by addition always becomes the maximum value and a watermark having a high density is formed. The addition processing may be achieved by executing an OR operation for each bit, or by outputting data obtained by bit conversion from the watermark pattern generating section 63 to the watermark composition processing section 59 (outputting watermark pattern data in place of halftone data) only when the data obtained by bit conversion for illegal copy warning text data is "15".

When the watermark pattern data is dispersed large dots data (X=0) and data of the pixel indicates printing (Z≠0) (step S34: YES), the control section 1 causes the watermark composition processing section 59 to correct halftone data associated with the other planes, which are not used for a watermark (step S35). For example, the following correction is performed for the above (C'+Z, M', Y', K'). A predetermined value "a" is subtracted from values indicative of the respective planes of M (magenta), Y (yellow) and K (black), so that halftone data becomes (C'+Z, M'−a, Y'−a, K'−a). FIG. 9A illustrates an M plane segmented into pixels associated with halftone data, and FIG. 9B illustrates an M plane obtained by subtraction. Here, the pixels in FIGS. 9A and 9B correspond to FIG. 5D. It is to be understood from FIG. 9B that pixels having data "15" indicative of printing in FIG. 5D have small values. The same goes for the Y plane and the K plane.

When the watermark pattern data is clustered small dots data (X=1) or when data Z of the pixel indicative of printing is Z=0 (step S34: NO), the control section 1 advances the process to the step S36.

When a value obtained by subtraction becomes a negative value, a value obtained by subtraction is represented as "0". Alternatively, values indicative of the respective planes of M, Y and K may be multiplied by a correction factor "b" (0<b<1) to become (C'+Z, M'·b, Y'·b, K'·b). The part after the decimal point of a value obtained by multiplication is round off or truncated to the whole number. Since the values for other planes which are not used for a watermark are decreased as described above, the use of the recording material 7b-7d can be reduced in comparison with a case where an image is formed on the basis of halftone data. Here, when employing a structure wherein a=15 or b=0 is satisfied and only the recording material 7a corresponding to a plane to be used for a watermark is used, the use of the recording material 7b-7d can be further reduced.

When a plane to be used for a watermark is K and Z≠0 is satisfied, the values of the other planes, which are not used for a watermark, may be "0". When a plane to be used for a watermark is K as illustrated in FIG. 10A, the user can see little difference between C+K, which is obtained by adding K to halftone data of a pixel indicative of C, and K, which substitutes for halftone data of a pixel indicative of C, since K in C+K seems stronger than C. On the other hand, when a plane to be used for a watermark is a plane other than black, e.g., M as illustrated in FIG. 10B, the user can recognize C+M, which is obtained by adding M to halftone data of a pixel indicative of C, and M, which substitutes for halftone data of a pixel indicative of C, as entirely different colors. Accordingly, when a plane to be used for a watermark is K, the use of the recording material 7a-7c other than K can be reduced without any influence on the visibility for the user even if the values of C, M and Y of a pixel of halftone data corresponding to K of a watermark are "0".

Next, the control section 1 outputs CMYK data, which is obtained by the operation described above, to the image output apparatus 7 (step S36). The control section 1 then determines whether CMYK data for all pixels have been outputted to the image output apparatus 7 or not (step S37). When CMYK data for any pixel has not been outputted to the image output apparatus 7 (step S37: NO), the control section 1 returns the process to the step S31. When CMYK data for all pixels have been outputted to the image output apparatus 7 (step S37: YES), the control section 1 terminates the process.

Figure 11A:
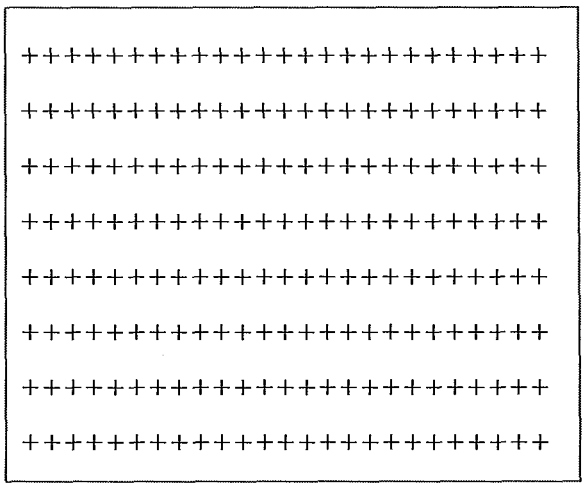
FIGS. 11A, 11B and 11C are schematic diagrams illustrating an image formed by an image output apparatus, which joins an original image with a watermark, and a copy image obtained by copying the image with a copying machine.
Figure 11B:
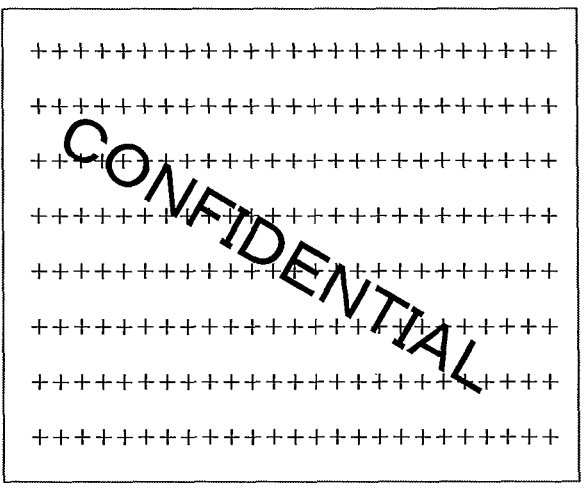
Figure 11C:
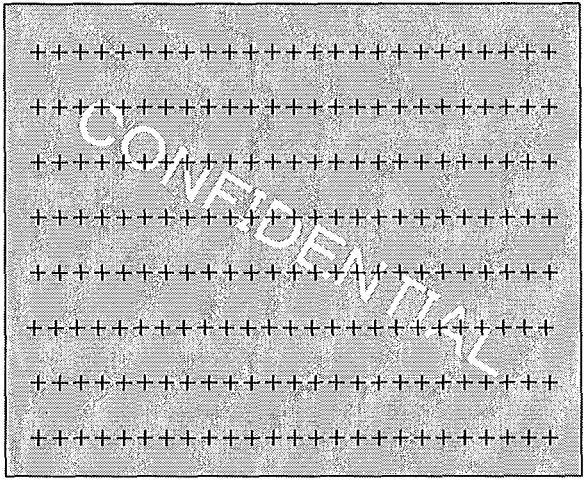

FIGS. 11A, 11B and 11C are schematic diagrams illustrating an image formed by the image output apparatus 7, which joins an original image with a watermark, and a copy image obtained by copying the image with a copying machine. FIG. 11A illustrates an image obtained by joining an original image with a watermark, FIG. 11B illustrates a copy image associated with a watermark of a positive type, and FIG. 11C illustrates a copy image associated with a watermark of a negative type. Here, an original image is an image associated with the halftone data described above.

In an image formed by the image forming apparatus 7 which joins an original image with a watermark, a watermark is invisible and an original image is clearly visible as illustrated in FIG. 11A. When copying an image obtained by joining an original image with a watermark of a positive type, obtained is such a view that a chromatic illegal copy warning text "CONFIDENTIAL" exists above an original document as illustrated in FIG. 11B. On the other hand, when copying an image obtained by joining an original image with a watermark of a negative type, obtained is such a view that a white-blank or hypochromic illegal copy warning text "CONFIDENTIAL" exists under an original document as illustrated in FIG. 11C.

Though the above description explains an example wherein the above-described processing of joining an original image with a watermark is stored in the ROM 1b as a program to be executed by a computer, the processing may be recorded in a computer-readable recording medium 20. By virtue of this, the recording medium 20, in which a program code (an executable code program, an intermediate code program, a source program and the like) for implementing the above processing is recorded, can be provided in a portable manner.

Here, a program associated with the processing of joining an original image with a watermark may be recorded in a program medium such as a memory, e.g. a ROM, to be used for processing at a microcomputer, or a recording medium reading device which is not illustrated in the drawings may be provided and the program may be recorded in a program medium to be inserted into the recording medium reading device. In any case, a program stored in the recording medium may be constructed to be executed by an accessing microprocessor. Moreover, in any case, a program code may be constructed to be read, downloaded to a program storage area, which is not illustrated in the drawings, in a microcomputer and executed. Here, it is to be assumed that a program to be downloaded is prestored in a main apparatus.

Here, the above program medium is a recording medium removable from the main apparatus, and may be a medium, which carries a program code in a fixed manner, including: a tape device such as a magnetic tape or a cassette tape; a disk device such as a magnetic disk (including a flexible disk and a hard disk) or an optical disk (including a CD (Compact Disk)-ROM, an MO (Magneto-Optical disk), an MD (Mini Disc) and a DVD (Digital Versatile Disc); a card device such as an IC (Integrated Circuit) card (including a memory card) or an optical card; and a semiconductor memory such as a mask ROM, an EPROM (Erasable Programmable Read Only Memory), an EEPROM (Electrically Erasable Programmable Read Only Memory) or a flash ROM.

Moreover, the image forming apparatus may be constructed to be connected with a communication network including the Internet, and the above program medium may be a medium which carries a program code in a dynamical manner so that a program code can be downloaded from the communication network. Here, when a program is to be downloaded from the communication network as described above, the program to be downloaded may be prestored in a main apparatus or alternatively installed from another recording medium. Here, the present invention can also be implemented in the form of a computer data signal embedded in a carrier signal, in which the above program code is implemented with electronic transmission. The above recording medium is read by a program reader provided in a computer system or a digital color image forming apparatus, so that the image processing method described above is executed.

In an image processing apparatus, an image forming apparatus, an image processing apparatus, a computer program and a recording medium according to Embodiment 1, for a pixel where an original image is to be joined with a watermark, a plane (e.g., C plane) associated with watermark data and a plurality of planes (e.g., C, M, Y and K planes) associated with original image data are selected as planes for image formation and the respective selected planes are joined with each other. Here, correction is executed for planes (M, Y and K planes) other than the C plane so that the density of colors indicated by the M, Y and K planes is decreased. On the other hand, for a pixel where an original image is not to be joined with a watermark, a plurality of planes (C, M, Y and K planes) associated with original image data are selected as planes for image formation. In such a structure, a watermark can be formed uniformly on a copy and degradation of the appearance can be avoided. Moreover, the consumption of the recording material 7b-7d can be reduced since the density of colors indicated by the M, Y and K planes associated with an original image is decreased for a pixel where a watermark is to be formed. Moreover, the loss of the color shade due to decrease of the density of colors indicated by the M, Y and K planes can be minimized and the quality of an image to be formed can be maintained, since the density of the C plane associated with a watermark is maintained for a pixel where a watermark is to be formed.

Moreover, the consumption of the recording material 7b-7d can be further reduced, since selection of the M, Y and K planes for a pixel where an original image is to be joined with a watermark is stopped as needed so that only a watermark associated with the C plane is formed. Moreover, the influence on image quality can be minimized, since planes of an original image are used without modification for a pixel where an original image is not to be joined with a watermark.

Moreover, the use of the recording material 7a-7c other than K can be reduced with little influence on the visibility for the user, since selection of the remaining planes for a pixel where an original image is to be joined with a watermark is stopped as needed when one plane associated with the watermark data is data indicative of back (K), so that the values of C, M and Y of a pixel of halftone data corresponding to K of a watermark become "0".

Moreover, the use of the recording material 7b-7d can be reduced, since watermark data associated with the C plane is outputted in accordance with a dot pattern to make a watermark visible as a result of making a copy and original image data associated with the M, Y and K planes are outputted after decreasing the color density, for a pixel where an original image is to be joined with a watermark. Moreover, an illegal copy warning text of a positive type or of a negative type becomes clearly visible for the user as a result of making a copy, and the decrease of image quality by making a copy can be reduced Moreover, when a reduction instruction of reducing the use of the recording material 7a-7d for image formation is accepted, correction is executed for the M, Y and K planes so that the desire of the user to reduce the use of the recording material 7b-7d can be reflected in image formation. For example, the user can select whether the use of the recording material 7b-7d is to be reduced or not through the operation section 9 such as a control switch or a control panel, depending on the intended use (e.g., security level) of the original. The user can select to reduce the use of the recording material 7a-7d when the image quality of a copy obtained by reducing the use of the recording material 7a-7d is suitable for the intended use, or not to reduce the use when the image quality is unsuitable.

Here, a plane associated with watermark data is not limited to the C plane but may be the M plane or the K plane.

Embodiment 2

Figure 12:
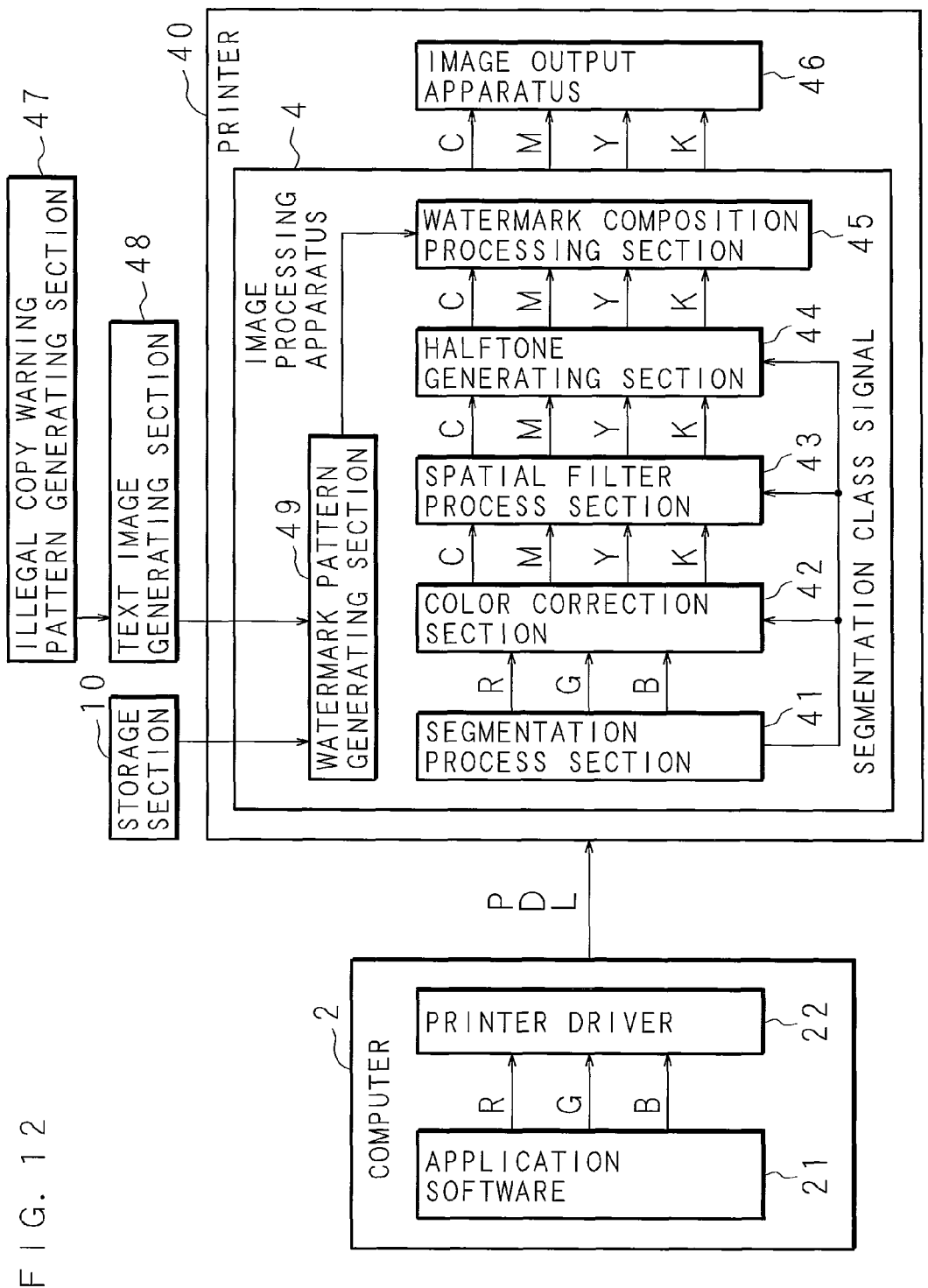
FIG. 12 is a block diagram illustrating a computer and a printer according to Embodiment 2.

The following description will explain the present invention in detail with reference to the drawings illustrating a computer and a printer according to Embodiment 2. FIG. 12 is a block diagram illustrating a computer and a printer.

A computer 2 has application software 21 such as image editing software and printer driver 22 installed thereon. Image data created using the application software 21 is converted into PDL (Page Description Language: printer description language for describing the point of origin, the size and the color for each region) by the printer driver 22 and transmitted to a printer 40.

The printer 40 is provided with a segmentation process section 41, a color correction section 42, a spatial filter process section 43, a halftone generating section 44, a watermark composition processing section 45, an image output apparatus 46, an illegal copy warning text generating section 47, a text image generating section 48 and a watermark pattern generating section 49.

The segmentation process section 41 is to recognize respective regions composing image data outputted from a computer. The segmentation process section 41 checks attribute information of the respective regions and distinguishes: a text region occupied by text data; a graphic region occupied by graphics, graphs or the like; a natural image region occupied by photographic image data; and the like. The type of objects such as a text, a graphic and a photograph which have different description formats of printing data can be distinguished by reading the description format.

The color correction section 42 performs the processing of removing color impurity caused by the spectral characteristics of CMY (C: Cyan, M; Magenta, Y; Yellow) color materials including unnecessary absorption components in order to improve the color reproducibility, performs black generation for generating a black (K) signal from a three color C'M'Y' signal, and performs under color removal processing of subtracting the K signal obtained by black generation from the original C'M'Y' signal to generate a new CMY signal. That is, an RGB signal is converted into a CMYK signal.

The spatial filter process section 43 performs slight smoothing by spatial filter processing using a digital filter, on image data of a CMYK signal inputted from the color correction section 42 in order to reproduce the edge of a text or a line having a smoother curve. The halftone generation section 44 segments an image into respective pixels, performs multi-level dithering so as to reproduce the tone of each pixel, and executes tone reproduction processing (halftone generation). Image data obtained by executing tone reproduction processing is transmitted to the image output apparatus 46 and an image is formed on a sheet such as paper.

The illegal copy warning text generating section 47, the text image generating section 48 and the watermark pattern generating section 49 generate a pattern of a watermark to be added in the same manner as the illegal copy warning text generating section 61, the text image generating section 62 and the watermark pattern generating section 63 described above. The illegal copy warning text generating section 47, the text image generating section 48 and the watermark pattern generating section 49 may generate a pattern prestored in the storage section 10 such as an SSD (Solid State Drive) or an HDD (Hard Disk Drive), or may generate a pattern depending on a set value inputted by the user.

The watermark composition processing section 45 joins the watermark pattern generated by the watermark pattern generating section 49 with the CMYK signal outputted from the halftone generating section 44. The watermark pattern is joined with a signal of any one plane, which is specified in advance, among the C, M and K planes. A CMYK signal joined with a watermark is outputted to the image output apparatus 46 and the image output apparatus 46 forms an image. Here, an image output apparatus 46 refers to an apparatus for reproducing an image such as an electrophotographic printer or an ink-jet printer, and differs from an apparatus for displaying an image on a liquid crystal display or the like placed at a control panel of a multi-function peripheral or a printer.

The computer 2 and the printer 40 according to Embodiment 2 can reduce the consumption of recording material and join an original image with a watermark as in an image forming apparatus, an image processing apparatus, an image processing method, a computer program and a recording medium according to Embodiment 1. Here, since the computer 2 and the printer 40 according to Embodiment 2 include some parts having the same structures as those of Embodiment 1, the parts are denoted by identical symbols and detailed explanation thereof is omitted.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus comprising:
a generating section for generating watermark data indicative of a watermark for copy control, which appears as a result of making a copy; and
a composition section for joining original image data obtained by reading an original document with the watermark data generated by the generating section,
wherein the original image data includes data of a plurality of color components associated with a pixel constituting an image,
wherein the watermark data includes data of one color component associated with a pixel constituting an image,
further comprising:
a first selecting section for selecting data of one color component associated with the watermark data and data of a plurality of color components associated with the original image data for a pixel where data of one color component associated with the watermark data is used for image formation;
a density decreasing section for decreasing density of colors indicated by data of remaining color components, which is obtained by excluding data of a same color as data of one color component associated with the watermark data from data of a plurality of color components associated with the original image data selected by the first selecting section; and
a second selecting section for selecting data of a plurality of color components associated with the original image data for a pixel where data of one color component associated with the watermark data is not used for image formation;
wherein composite data is composed from data of one color component associated with the watermark data and data of a plurality of color components associated with the original image data selected by the first selecting section and outputted, or data of a plurality of color components associated with the original image data selected by the second selecting section is outputted.

2. The image processing apparatus according to claim 1, wherein the first selecting section does not perform selection of the data of remaining color components.

3. The image processing apparatus according to claim 2, wherein the first selecting section does not perform selection of the data of remaining color components when the data of one color component is data which indicates black.

4. The image processing apparatus according to claim 1, wherein the watermark data for each pixel is associated with a dot pattern, which appears as a result of making a copy, or a dot pattern, which does not appear as a result of making a copy, and data of one color component associated with the watermark data and data of remaining color components having a color density decreased by a predetermined operation are outputted for the pixel corresponding to the dot pattern, which appears as a result of making a copy.

5. The image processing apparatus according to claim 1, further comprising an accepting section for accepting an instruction of saving usage of recording material for image formation, wherein the density decreasing section decreases density of colors indicated by the data of remaining color components when the instruction is accepted by the accepting section.

6. An image forming apparatus comprising:

an image processing apparatus according to claim 1; and a forming section for forming an image on a sheet on a basis of the original image data and the watermark data, which are processed by the image processing apparatus.

7. An image processing method comprising steps of:

generating watermark data indicative of a watermark for copy control, which appears as a result of making a copy; and joining original image data obtained by reading an original document with the generated watermark data, wherein the original image data includes data of a plurality of color components associated with a pixel constituting an image, wherein the watermark data includes data of one color component associated with a pixel constituting an image, further comprising steps of:

selecting data of one color component associated with the watermark data and data of a plurality of color components associated with the original image data for a pixel where data of one color component associated with the watermark data is used for image formation;

decreasing density of colors indicated by data of remaining color components, which is obtained by excluding data of a same color as data of one color component associated with the watermark data from data of a plurality of color components associated with the original image data selected in said step;

selecting data of a plurality of color components associated with the original image data for a pixel where data of one color component associated with the watermark data is not used for image formation;

composing composite data from the data of one color component and data of a plurality of color components associated with the original image data and outputting the composite data when data of one color component associated with the watermark data and data of a plurality of color components associated with the original image data are selected; and outputting the data of a plurality of color components when data of a plurality of color components associated with the original image data is selected.

8. A non-transitory computer-readable medium, in which a computer program is recorded, the computer program comprising steps of:

causing a computer to generate watermark data indicative of a watermark for copy control, which appears as a result of making a copy; and causing a computer to join original image data obtained by reading an original document with the generated watermark data, wherein the original image data includes data of a plurality of color components associated with a pixel constituting an image, wherein the watermark data includes data of one color component associated with a pixel constituting an image, further comprising steps of:

causing a computer to select data of one color component associated with the watermark data and data of a plurality of color components associated with the original image data for a pixel where data of one color component associated with the watermark data is used for image formation;

causing a computer to decrease density of colors indicated by data of remaining color components, which is obtained by excluding data of a same color as data of one color component associated with the watermark data from data of a plurality of color components associated with the original image data selected in said step;

causing a computer to select data of a plurality of color components associated with the original image data for a pixel where data of one color component associated with the watermark data is not used for image formation;

causing a computer to compose composite data from the data of one color component and data of a plurality of color components associated with the original image data and output the composite data when data of one color component associated with the watermark data and data of a plurality of color components associated with the original image data are selected; and causing a computer to output the data of a plurality of color components when data of a plurality of color components associated with the original image data is selected.

* * * * *